United States Patent
Yeh

(10) Patent No.: US 7,995,131 B2
(45) Date of Patent: Aug. 9, 2011

(54) AUTO-FOCUSING IMAGING DEVICE AND AUTO-FOCUSING IMAGE CAPTURE METHOD THEREOF

(75) Inventor: Chun-Nan Yeh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 344 days.

(21) Appl. No.: 12/189,101

(22) Filed: Aug. 8, 2008

(65) Prior Publication Data

US 2009/0175610 A1     Jul. 9, 2009

(30) Foreign Application Priority Data

Dec. 27, 2007  (CN) ........................ 2007 1 0203461

(51) Int. Cl.
  *G03B 13/00*   (2006.01)
  *G03B 17/00*   (2006.01)
  *H04N 5/232*   (2006.01)
(52) U.S. Cl. ........ 348/345; 348/348; 348/349; 348/353; 348/354; 348/356; 396/79; 396/80; 396/81; 396/89; 396/102
(58) Field of Classification Search .......... 348/345–356; 396/79, 80, 81, 82, 89, 93, 102, 103, 104, 396/121–127, 133
See application file for complete search history.

(56) References Cited

U.S. PATENT DOCUMENTS

| 7,145,598 | B2* | 12/2006 | Maeda | 348/222.1 |
| 7,486,330 | B2* | 2/2009 | Sawachi | 348/345 |
| 7,719,603 | B2* | 5/2010 | Lee | 348/345 |
| 7,734,166 | B2* | 6/2010 | Hamamura et al. | 396/104 |
| 2003/0174230 | A1* | 9/2003 | Ide et al. | 348/345 |
| 2007/0116448 | A1* | 5/2007 | Liao et al. | 396/89 |
| 2007/0212049 | A1* | 9/2007 | Guroglu et al. | 396/127 |
| 2010/0225800 | A1* | 9/2010 | Lee | 348/347 |

\* cited by examiner

*Primary Examiner* — Sinh Tran
*Assistant Examiner* — Selam Gebriel
(74) *Attorney, Agent, or Firm* — Zhigang Ma

(57) ABSTRACT

An imaging device includes a capturing module with at least one lens for capturing an image from a scene, a driving module for driving the at least one lens to different focusing positions using different driving steps, a flat-scene judging module, and a step-judging module. The flat-scene judging module divides the image into a central area and a plurality of peripheral areas, and determines whether the captured scene is a flat scene according to the divided image. The step-judging module determines whether the driving steps corresponding to a maximum focusing value of the central area of the image are same as driving steps corresponding to respective maximum focusing values of the peripheral areas of image, and changes the driving steps corresponding to the maximum focusing value of the central area to the driving steps corresponding to the greatest one of the maximum focusing values of the peripheral areas.

7 Claims, 6 Drawing Sheets

AUTO-FOCUSING IMAGING DEVICE AND AUTO-FOCUSING IMAGE CAPTURE METHOD THEREOF

BACKGROUND

1. Field of the Invention

The present invention relates to an imaging device.

2. Description of the Related Art

When an imaging device, such as a digital camera, is used to capture an image from a flat scene, a central area of the image is clear while peripheral areas of the image may be blurred because the lens module in the imaging device is tilted or decentered relative to an imaging sensor during assembling of the image device.

What is needed, therefore, is to provide an imaging device, in which blurring of the peripheral areas of the image formed thereby is eliminated or at least alleviated.

SUMMARY

The present invention relates to an imaging device. The imaging device includes a capturing module with at least one lens for capturing an image of a scene, a driving module for driving the at least one lens to different focusing positions using different driving steps, a flat-scene judging module, and a step-judging module. The flat-scene judging module divides the image into a central area and a plurality of peripheral areas, and determines whether the captured scene is a flat scene according to the divided image. The step-judging module determines whether the driving steps corresponding to a maximum focusing value of the central area of the image are the same as driving steps corresponding to respective maximum focusing values of the peripheral areas of the image, and changes the driving steps corresponding to the maximum focusing value of the central area to the driving steps corresponding to the greatest one of the maximum focusing values of the peripheral areas.

Other advantages and novel features of the present invention will become more apparent from the following detailed description of exemplary embodiments when taken in conjunction with the accompanying drawings.

DETAILED DESCRIPTION OF THE EMBODIMENTS

Reference will now be made to the drawings to describe the exemplary embodiments in detail.

Figure 1:
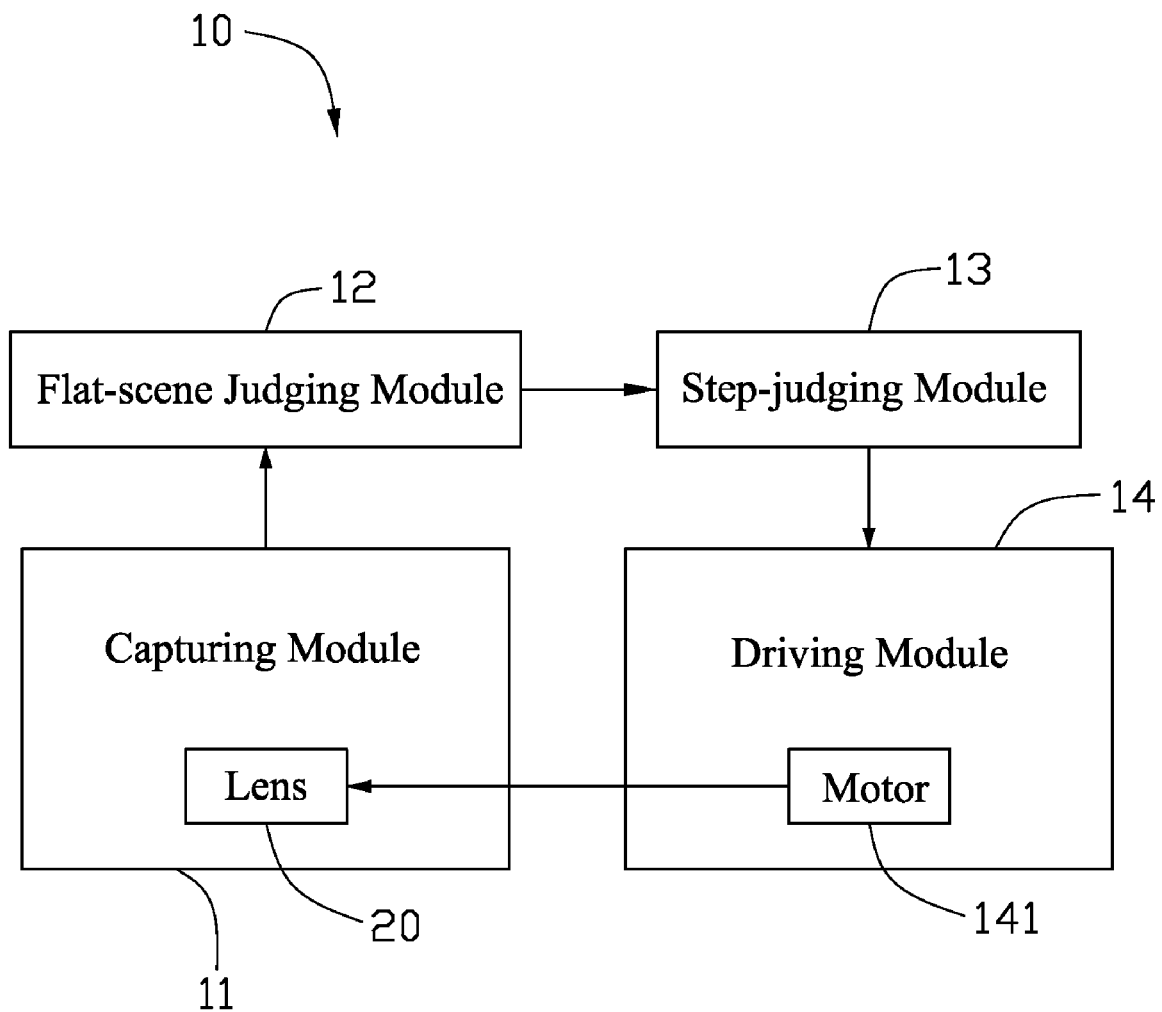
FIG. 1 is function block diagram of an imaging device according to an exemplary embodiment.

Referring to FIG. 1, an imaging device 10 includes a capturing module 11, a flat-scene judging module 12, a step-judging module 13, and a driving module 14. The capturing module 11 is configured for capturing an image M FIG. 3 from a current scene. The capturing module 11 includes a lens 20 for focusing light from the current scene into an imaging sensor (not shown) in the capturing module 11. The driving module 14 includes a motor 141 for driving the lens 20 to different focusing positions using different driving steps of the motor 141.

Figure 2:
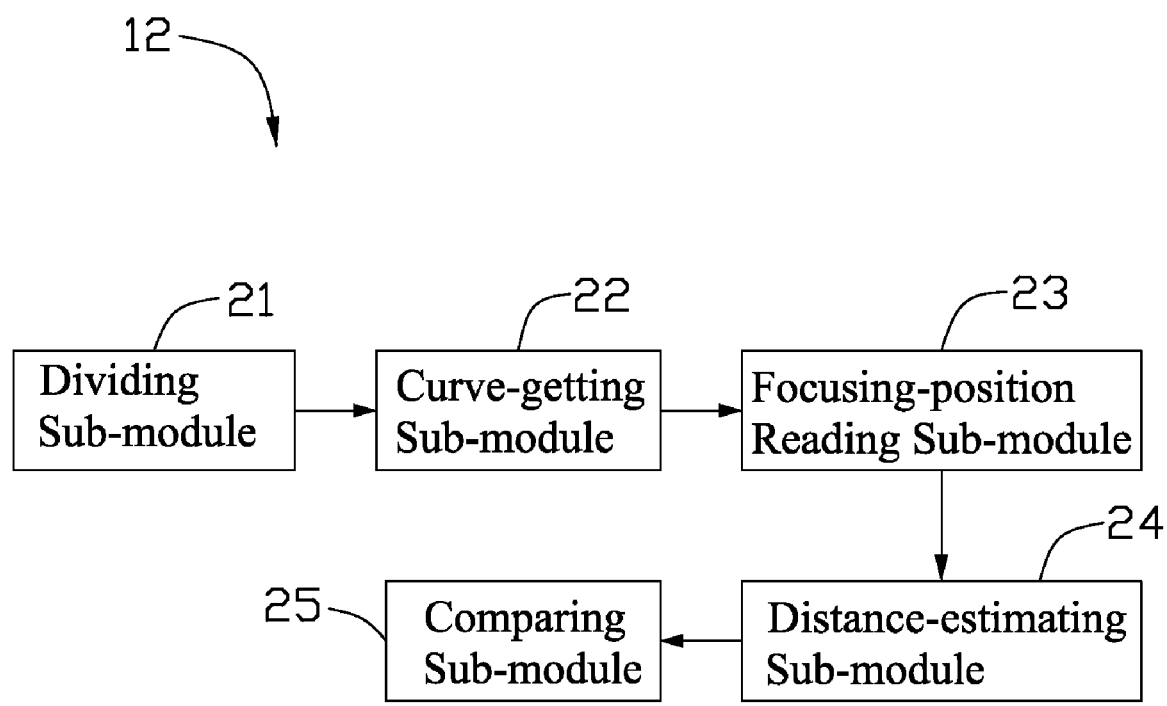
FIG. 2 is function block diagram of a flat-scene judging module of the imaging device of FIG. 1.

The flat-scene judging module 12 is configured for determining whether the captured scene is a flat scene according to the image M. Referring to FIG. 2, the flat-scene judging module 12 includes a dividing sub-module 21, a curve-getting sub-module 22, a focusing-position reading sub-module 23, a distance-estimating sub-module 24, and a comparing sub-module 25.

Figure 3:
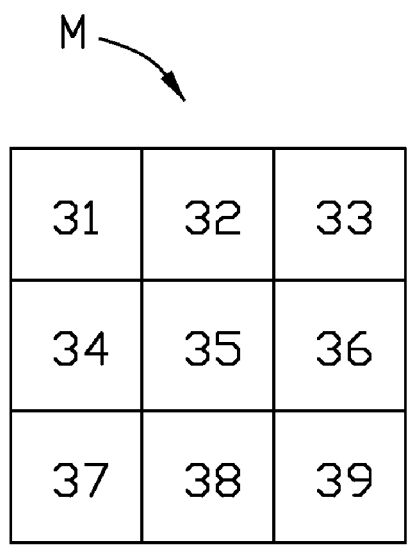
FIG. 3 shows an image divided into nine areas by a dividing sub-module of the flat-scene judging module of FIG. 2.

The dividing sub-module 21 is configured for dividing the image M into a plurality of areas. The plurality of areas includes a central area and several peripheral areas. Referring to FIG. 3, in the exemplary embodiment, the image M is divided into nine areas by the dividing sub-module 21, labeled as areas 31-39, from left to right, and top to bottom of the image M, herein the area 35 is the central area and the other eight areas are the peripheral areas. It is to be understood that an alternative dividing fashion can be selected, but there must be a central area located in the center of the image M.

Figure 4:
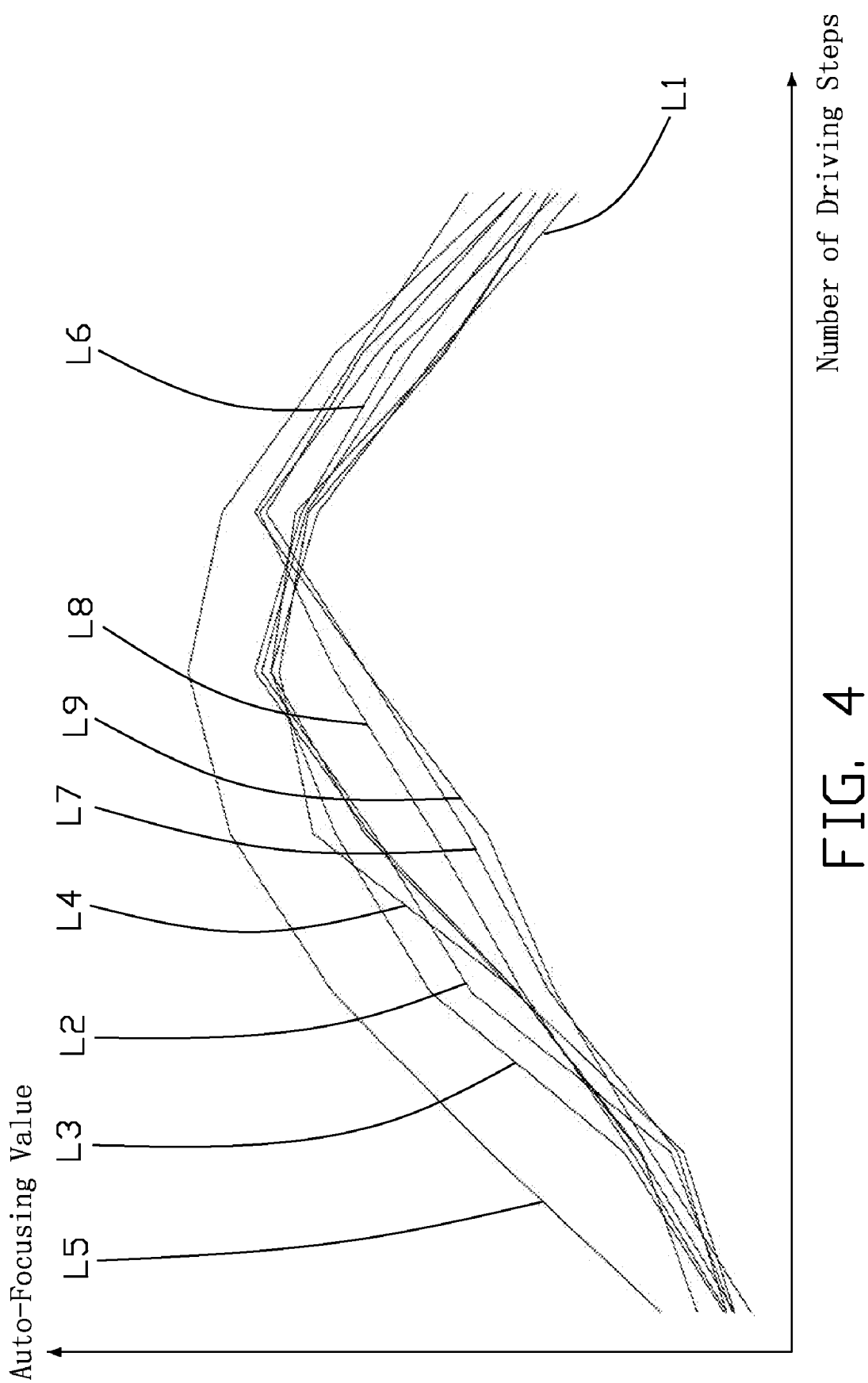
FIG. 4 shows auto-focusing curves of the divided nine areas of the image of FIG. 3.

The curve-getting sub-module 22 is configured for getting respective auto-focusing curves of areas 31 to 39 at different driving steps of the motor 141. Referring to FIG. 4, the vertical axis of a diagram represents auto-focusing values, and the horizontal axis of the diagram represents driving steps of the motor 141. Auto-focusing curves L1-L9 are formed from a plurality of auto-focusing values of the areas 31 39 respectively at different driving steps of the motor 141.

The focusing-position reading sub-module 23 is configured for reading a plurality of focusing positions i.e., a plurality of numbers of driving steps of the motor 141 according to the auto-focusing curves L1-L9. In the exemplary embodiment, some driving steps of the motor 141 are selected, as shown in Table 1.

TABLE 1

| Focusing Value | Driving Steps | | | | | | | |
|---|---|---|---|---|---|---|---|---|
| | 12 | 14 | 16 | 18 | 20 | 22 | 24 | 26 |
| AF-31 | 10002 | 10550 | 12359 | 14021 | 15024 | 14534 | 13213 | 11700 |
| AF-32 | 10012 | 10677 | 12853 | 13910 | 15138 | 14670 | 13500 | 12151 |
| AF-33 | 10100 | 11189 | 13300 | 14327 | 15017 | 14764 | 13178 | 12002 |
| AF-34 | 10392 | 10998 | 12333 | 14580 | 14960 | 14631 | 13135 | 11996 |
| AF-35 | 10792 | 12650 | 14353 | 15469 | 15941 | 15564 | 14328 | 12510 |
| AF-36 | 10007 | 11034 | 12347 | 13972 | 15210 | 14707 | 13689 | 11904 |
| AF-37 | 10077 | 10599 | 11985 | 12906 | 14003 | 15086 | 14035 | 12326 |
| AF-38 | 10090 | 11121 | 12284 | 13261 | 14337 | 15172 | 13894 | 12301 |
| AF-39 | 9803 | 10912 | 11953 | 12691 | 13983 | 15203 | 14098 | 12900 |
| Calculated Distance from an Object (millimeters) | 801 | 684 | 595 | 559 | 471 | 425 | 387 | 355 |

In Table 1, AF-31 through AF-39 represents auto-focusing values of the auto-focusing curves L1-L9 respectively at different driving steps of the motor 141.

The distance-estimating sub-module 24 is configured for approximately calculating respective distances between the imaging device 10 and the captured scene according to the different driving steps of the motor 141. The calculated distance can be found in a table similar to Table 1, which is provided by a manufacturer of the imaging device 10. Shadowed regions in Table 1 show maximum focusing values corresponding to peaks of the auto-focusing curves L1-L9 respectively.

The comparing sub-module 25 is configured for comparing the calculated distance corresponding to the central area 35 at the maximum focusing value of the auto-focusing curve L5 with the calculated distances corresponding to the peripheral areas 31, 32, 33, 34, 36, 37, 38, and 39 at the respective maximum focusing values of the auto-focusing curves L1, L2, L3, L4, L6, L7, L8 and L9, and determining differences therebetween. If all differences are equal to or smaller than a reference difference value, the flat-scene judging module 12 determines the captured scene is a flat scene. If the one of the differences is greater than the reference difference value, the flat-scene judging module 12 determines the captured scene is not a flat scene. In the exemplary embodiment, the reference difference value is 150 millimeters (mm), which is obtained by experiments. Referring to Table 1, the calculated distance corresponding to the central area 35 is 471 mm at the maximum focusing value of the contrast curve L5, and all differences are smaller than 150 mm. That is, the captured scene is a flat scene.

If the captured scene is a flat scene, the step-judging module 13 is configured for determining whether number of driving steps corresponding to the maximum focusing value of the auto-focusing curve L5 of the central area 35 is same as that corresponding to the respective maximum focusing values of the auto-focusing curves L1, L2, L3, L4, L6, L7, L8, L9 of the peripheral areas 31, 32, 33, 34, 36, 37, 38, and 39. If not, the number of the driving steps of the motor 141 corresponding to the maximum focusing value AF-35 of the auto-focusing curve L5 of the central area 35 is changed to the number of the driving steps of the motor 141 corresponding to the greatest one of the maximum focusing values AF-31, AF-32, AF-33, AF-34, AF-36, AF-37, AF-38, AF-39 of the auto-focusing curves L1, L2, L3, L4, L6, L7, L8, L9 of the peripheral areas 31, 32, 33, 34, 36, 37, 38, and 39 by the step-judging module 13. Referring to Table 1 again, the respective number of the driving steps of the motor 141 corresponding to the maximum focusing values AF-31, AF-32, AF-33, AF-34, AF-35, and AF-36 is the same, which herein is 20, while the respective number of the driving steps corresponding to the maximum focusing values AF-37, AF-38, and AF-39 is the same, which herein are 22. Because the greatest one of the maximum focusing values AF-37, AF-38, and AF-39 of the auto-focusing curves L7, L8, L9 of the peripheral areas 37, 38, and 39 is 15203 (AF-39) corresponding to the peripheral area 39 as shown in Table 1, and the number of the driving steps of the motor 141 corresponding to the maximum focusing value AF-35 of the auto-focusing curve of the central area 35 is changed from 20 to 22. Correspondingly, the focusing position corresponding to the maximum focusing value AF-35 of the auto-focusing curve L5 of the central area 35 is offset to the focusing position corresponding to the maximum focusing value AF-39 of the auto-focusing curve L9 of the peripheral area 39 of the image M by the motor 141. As a result, a blurring of the peripheral areas of the image M can be avoided while a central blurring of the image M is in an acceptable range.

Figure 5:
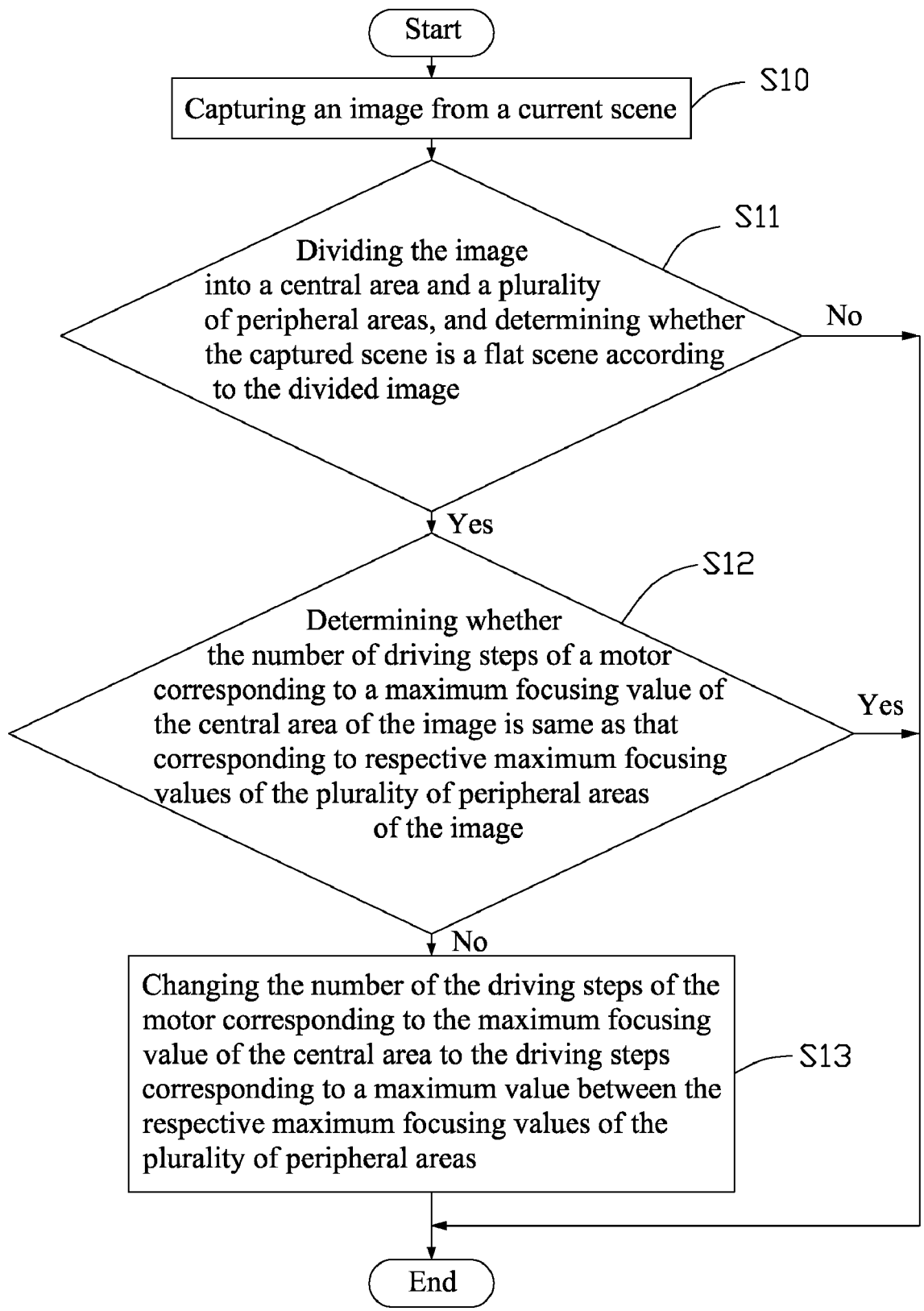
FIG. 5 is a flowchart of an image capturing method of the imaging device of FIG. 1.

Referring to FIG. 5, a flowchart of an image capturing method of the imaging device 10, is shown. The method includes capturing an image of a current scene (S10); dividing the image into a central area and a plurality of peripheral areas, and determining whether the captured scene is a flat scene according to the divided image (S11); if the captured scene is a flat scene, determining whether the number of driving steps of a motor corresponding to a maximum focusing value of the central area of the image is same as that corresponding to respective maximum focusing values of the plurality of peripheral areas of the image (S12); and if the number of the driving steps of the motor corresponding to the maximum focusing value of the central area is not same as the number of the driving steps of the motor corresponding to respective maximum focusing values of the plurality of peripheral areas, changing the number of the driving steps of the motor corresponding to the maximum focusing value of the central area to the number of the driving steps corresponding to the greatest one of the respective maximum focusing values of the plurality of peripheral areas (S13).

Figure 6:
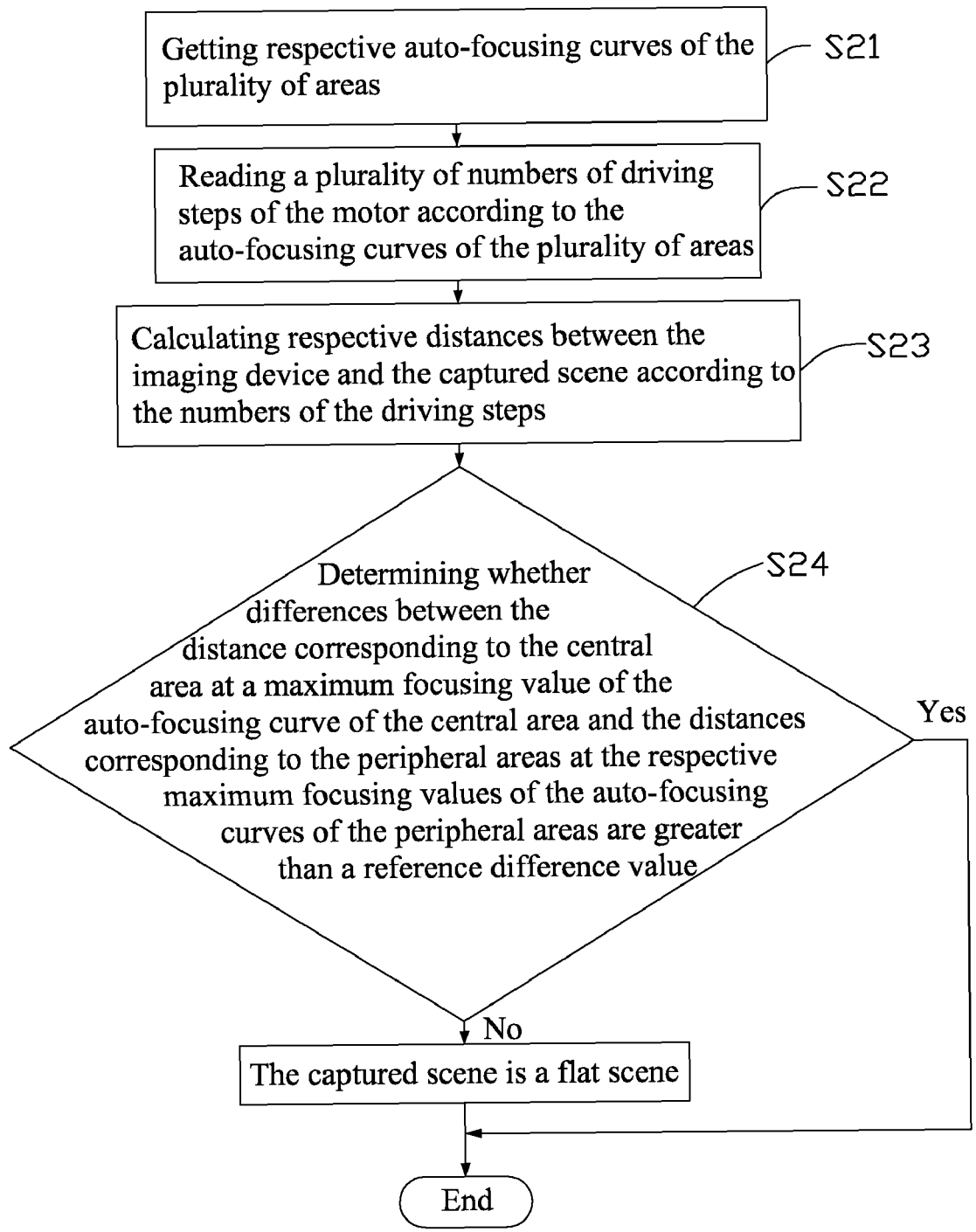
FIG. 6 is a sub-flow chart of the image capturing method of FIG. 5.

Referring to FIG. 6, the Step S11 further includes getting respective auto-focusing curves of the plurality of areas (S21); reading a plurality of numbers of driving steps of the motor according to the auto-focusing curves of the plurality of areas (S22); calculating respective distances between the imaging device and the captured scene according to the numbers of the driving steps (S23); determining whether differences between the distance corresponding to the central area at a maximum focusing value of the auto-focusing curve of the central area and the distances corresponding to the peripheral areas at the respective maximum focusing values of the auto-focusing curves of the peripheral areas are greater than a reference difference value (S24); if no, the captured scene is a flat scene.

The above mentioned method can be performed by the imaging device 10. In a process of capturing images by the method, the number of driving steps of the motor corresponding to the maximum focusing value of the central area is kept constant.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An imaging device, comprising:
    a capturing module for capturing an image from a scene, the capturing module including at least one lens;
    a driving module capable of driving the at least one lens to different focusing positions using different driving steps;
    a flat-scene judging module capable of dividing the image into a central area and a plurality of peripheral areas, and determining whether the captured scene is a flat scene according to the divided image; and
    a step-judging module capable of determining whether the number of the driving steps corresponding to a maximum focusing value of the central area of the image is same as the number of driving steps corresponding to respective maximum focusing values of the peripheral areas of image, if the number of driving steps corresponding to the maximum focusing value of the central area is not same as the number of the driving steps corresponding to respective maximum focusing values of the plurality of peripheral areas, and changing the driving steps corresponding to the maximum focusing value of the central area to the driving steps corresponding to the greatest one of the maximum focusing values of the peripheral areas.

2. The imaging device as claimed in claim 1, wherein the imaging device is one of a digital still camera or a camcorder.

3. The imaging device as claimed in claim 1, wherein the flat-scene judging module includes:
   a dividing sub-module capable of dividing the image into the central area and the plurality of peripheral areas;
   a curve-getting sub-module capable of getting respective auto-focusing curves of the central area and the peripheral areas at different driving steps of the driving module;
   a focusing-position reading sub-module capable of reading the driving steps of the driving module according to the auto-focusing curves;
   a distance-estimating sub-module capable of approximately calculating respective distances between the imaging device and the captured scene according to the different driving steps of the driving module; and
   a comparing sub-module capable of comparing the calculated distance corresponding to the central area at the maximum focusing value of the auto-focusing curve of the central area with the calculated distances corresponding to the peripheral areas at the respective maximum focusing values of the auto-focusing curves of the peripheral areas, and determining differences therebetween.

4. The imaging device as claimed in claim 1, wherein the image is divided into nine areas.

5. An image capture method of an imaging device, comprising:
   capturing an image from a scene;
   dividing the image into a central area and a plurality of peripheral areas;
   determining whether the captured scene is a flat scene according to the image;
   if the captured scene is a flat scene, determining whether the number of driving steps of a motor corresponding to a maximum focusing value of the central area of the image is same as the number of driving steps corresponding to respective maximum focusing values of the plurality of peripheral areas of the image; and
   if the number of driving steps of the motor corresponding to the maximum focusing value of the central area is not same as the number of the driving steps of the motor corresponding to respective maximum focusing values of the plurality of peripheral areas, changing the driving steps of the motor corresponding to the maximum focusing value of the central area to the driving steps corresponding to the greatest one of the respective maximum focusing values of the plurality of peripheral areas.

6. The method as claimed in claim 5, for determining whether the captured scene is a flat scene, further comprising:
   getting respective auto-focusing curves of the plurality of areas;
   reading a plurality of driving steps of the motor according to the auto-focusing curves of the plurality of areas;
   calculating respective distances between the imaging device and the captured scene according to the plurality of driving steps; and
   determining whether differences between the distance corresponding to the central area at a maximum focusing value of the auto-focusing curve of the central area and the distances corresponding to the peripheral areas at the respective maximum focusing values of the auto-focusing curves of the peripheral areas are greater than a reference difference value, if no, the captured scene is a flat scene.

7. The method as claimed in claim 6, wherein the reference difference value is 150 millimeters.

* * * * *